US007954824B2

(12) United States Patent
Hu

(10) Patent No.: US 7,954,824 B2
(45) Date of Patent: Jun. 7, 2011

(54) COUPLING DEVICE

(76) Inventor: Bobby Hu, Taichung (TW)

( * ) Notice: Subject to any disclaimer, the term of this patent is extended or adjusted under 35 U.S.C. 154(b) by 1147 days.

(21) Appl. No.: 11/675,763

(22) Filed: Feb. 16, 2007

(65) Prior Publication Data

US 2008/0176437 A1 Jul. 24, 2008

(30) Foreign Application Priority Data

Jan. 19, 2007 (TW) ............................... 96102203 A

(51) Int. Cl.
*B23B 31/107* (2006.01)

(52) U.S. Cl. ............ 279/22; 279/75; 279/128; 279/137; 279/905; 279/906

(58) Field of Classification Search .................... 279/22, 279/30, 66, 75, 128, 137, 143, 905, 906; *B23B 31/107*

See application file for complete search history.

(56) References Cited

U.S. PATENT DOCUMENTS 2,751,229 A * 6/1956 Schultz ........................... 279/75
2,838,266 A * 6/1958 Rees .......................... 248/354.1
3,039,781 A * 6/1962 Bilz ................................ 279/75
3,398,965 A * 8/1968 Cox ................................ 279/30
3,521,895 A * 7/1970 Smith ............................. 279/22
3,975,032 A * 8/1976 Bent et al. ....................... 279/30
4,412,764 A * 11/1983 Wawrzyniak ................. 408/226
5,011,346 A * 4/1991 Pfalzgraf ...................... 409/234
5,195,761 A * 3/1993 Eimer ............................. 279/90
5,316,323 A * 5/1994 Jovanovic ....................... 279/22
5,464,229 A * 11/1995 Salpaka .......................... 279/30
6,270,085 B1 * 8/2001 Chen et al. ...................... 279/22
6,364,318 B1 * 4/2002 Bedi et al. ....................... 279/22
6,530,579 B1 * 3/2003 Houben et al. .................. 279/30
6,623,220 B2 * 9/2003 Nuss et al. .................... 408/204
7,669,860 B2 * 3/2010 Chiang ......................... 279/143
7,823,890 B2 * 11/2010 Chen ............................ 279/143
2001/0042964 A1 * 11/2001 Bedi et al. ....................... 279/30
2001/0046421 A1 * 11/2001 Cochran et al. ........... 408/239 R
2008/0217870 A1 * 9/2008 Shibata ........................... 279/82
2010/0229693 A1 * 9/2010 Chen ................................ 81/60

* cited by examiner

*Primary Examiner* — Eric A Gates
(74) *Attorney, Agent, or Firm* — Alan Kamrath; Kamrath & Associates PA

(57) ABSTRACT

A coupling device includes a body having an end for coupling with a handle. The body includes a compartment having a receiving space for receiving an object such as a bit. The receiving space includes a slanted face extending longitudinally outward and radially inward. A follower is slidably mounted in the compartment and includes an outer end having a restraining hole. A positioning member extends from a radially outer side through the restraining hole to a radially inner side of the follower and is slidable along the slanted face. The follower is biased outward by an elastic element toward the receiving space when the object is inserted into the receiving space and moves the follower longitudinally inward. A radial clamping force is imparted from the slanted face through the positioning member to securely clamp the object in the receiving space.

19 Claims, 13 Drawing Sheets

COUPLING DEVICE

BACKGROUND OF THE INVENTION

The present invention relates to a coupling device. More particularly, the present invention relates to a coupling device for releasably coupling with a bit or the like and allowing easy removal of the bit or the like.

FIG. 1 illustrates a screwdriver of the type allowing detachable coupling with a bit 90. The screwdriver includes a shank with a coupling section 1 for receiving an end of the bit 90. A magnet 2 is fixed in the coupling section 1 for retaining the bit 90 in place by magnetic attraction. Removal of the bit 90 from the screwdriver is not easy, for the exposed portion of the bit 90 outside the coupling section 1 is relatively small. Removal of the bit 90 becomes more difficult when there is oil on the user's hand.

FIG. 2 illustrates another type of bit coupling device including a sleeve 4 mounted around a screwdriver shank 7 and biased by a spring 72 to a position pressing two balls 5 radially inward for engaging with grooves 91 in an outer periphery of a bit 90, thereby retaining the bit 90 in a coupling groove in a coupling portion 3 of the shank 7. A magnet 6 is mounted in the coupling groove and attracts the bit 90. When detachment of the bit 90 is required, the sleeve 4 is moved longitudinally toward the bit 90 such that the balls 5 are no longer pressed by an inner periphery of the sleeve 4. Namely, a gap exists between the balls 5 and the inner periphery of the sleeve 4. The bit 90 is then pulled out of the coupling portion 3 of the shank 7, with the balls 5 moving radially outward toward the inner periphery of the sleeve 4. However, such a bit coupling device can be used for retaining bits 90 of a specific type. Specifically, the bit coupling device cannot be used with bits of another type having different notch depths and/or different diameter sizes. In a case of a bit having shallower grooves, the bit cannot be retained in place, as the balls 5 cannot be securely engaged in the grooves. In another case of a bit having a smaller outer diameter, it is impossible to reliably retain the bit in the coupling portion 3. Furthermore, the sleeve 4 mounted around the coupling portion 3 hinders use of the screwdriver for driving a screw 99 in a limited space such as a deep hole.

The present invention is intended to provide a coupling device that mitigates and/or obviates the above-mentioned problems.

BRIEF SUMMARY OF THE INVENTION

The present invention solves these and other problems in bit coupling devices by providing, in a preferred form, a coupling device including a body having an end adapted to be coupled with a handle. The other end of the body is adapted for removably receiving an object such as a bit or the like. The body includes a compartment having a receiving space adapted for receiving the object. The receiving space includes an inner periphery having a slanted face that extends longitudinally outward and radially inward from an inner end of the receiving space. A follower is mounted in the compartment and slidable in a longitudinal direction of the body. The follower includes an inner end and an outer end. The outer end of the follower includes a radially outer side and a radially inner side distant to the slanted face. The outer end of the follower further includes a restraining hole extending from the radially outer side through the radially inner side. A positioning member extends from the radially outer side through the restraining hole to the radially inner side. The positioning member is slidable along the slanted face. The maximum outer diameter of the positioning member is larger than the minimum diameter of the restraining hole. A first spring is mounted in the compartment and biases the follower outward toward the receiving space when the object is inserted into the receiving space and moves the follower longitudinally inward. The positioning member securely clamps the object in the receiving space between the follower and a portion of the inner periphery of the receiving space opposite to the follower. A radial clamping force is imparted from the slanted face through the positioning member to the object.

In the most preferred form, a support rod is mounted in the compartment and slidable in the longitudinal direction of the body. The support rod includes an inner portion having an inner end and an outer portion having an outer end. The support rod further includes a groove extending in a longitudinal direction of the body and through opposite sidewalls of the inner portion. An end wall defining an inner end of the groove forms the inner end of the inner portion. The follower includes an inner section, an outer section, and a transition section between the inner and outer sections. The inner section of the follower is slidably received in the groove of the support rod. The outer section of the follower is outside the groove and parallel to and spaced from the outer portion of the support rod. A magnet is mounted in the outer end of the outer portion of the support rod for attracting the object.

In the preferred form, the first elastic element is mounted between the inner end of the follower and an end wall of the compartment opposite to the receiving space. In the most preferred form, the inner end of the support rod includes a through-hole in communication with the groove of the inner portion of the support rod. The first elastic element is a coil spring having an end mounted around a protrusion on the inner end of the follower.

In the most preferred form, the body includes a reduced section having a guide slot in a peripheral wall thereof. The guide slot extends in a longitudinal direction parallel to a longitudinal axis of the body and in a radial direction to be in communication with the compartment. The inner end of the follower includes a transverse hole extending in a direction transverse to a longitudinal direction of the follower. A release member is mounted around the reduced section of the body and has an outer diameter not greater than the maximum outer diameter of the body. A pin is extended through a pin hole in the release member, the guide slot of the body, the transverse hole of the follower, and the groove of the support rod such that movement of the release member in the longitudinal direction away from the receiving space causes longitudinal movement of the follower and the positioning member away from the receiving space to release the radial clamping force, allowing removal of the bit from the receiving space.

In the most preferred form, the compartment of the body further includes a first shoulder, the outer portion of the support rod includes a second shoulder, and a second elastic element is mounted between the shoulders. The second elastic element is compressed when the object is received in the receiving space. When the release member is moved longitudinally away from the receiving space, the radial clamping force is released. Thus, the second elastic element pushes the object outward away from the receiving space. When the release member is released, the first elastic element pushes the object outward away from the receiving space such that an exposed portion of the object outside the receiving space is large enough to allow easy removal of the object from the receiving space.

In the most preferred form, the restraining hole includes a conic section and a rectilinear section. The conic section is adjacent to the radially outer side and tapers from the radially outer side toward the radially inner side. The rectilinear section is adjacent to the radially inner side and has a diameter substantially the same as the minimum inner diameter of the conic section. The positioning member is a ball having a diameter slightly smaller than the maximum inner diameter of the conic section and larger than the minimum inner diameter of the conic section.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
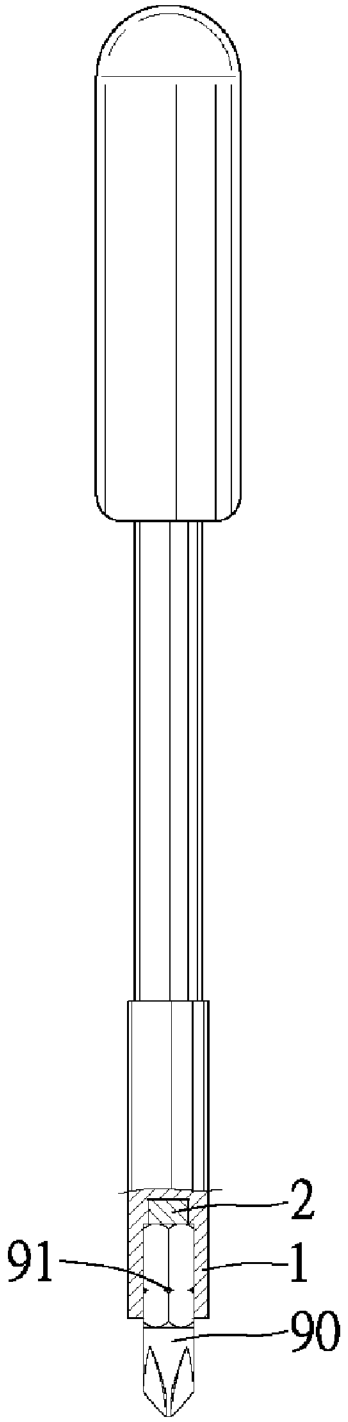
Fig. 1 PRIOR ART
FIG. 1 is a partially sectioned elevational view of a screwdriver with a conventional bit coupling device.
Figure 2:
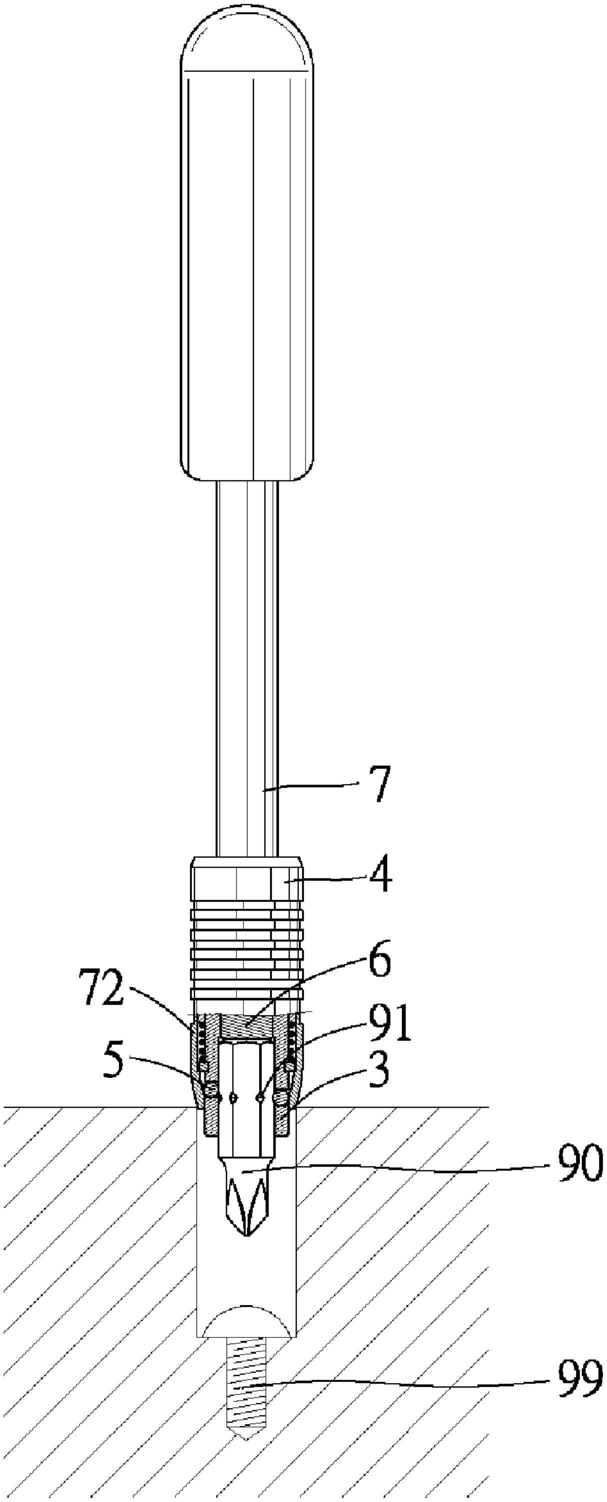
Fig. 2 PRIOR ART
FIG. 2 is a partially sectioned elevational view of a screwdriver with another conventional bit coupling device.
Figure 3:
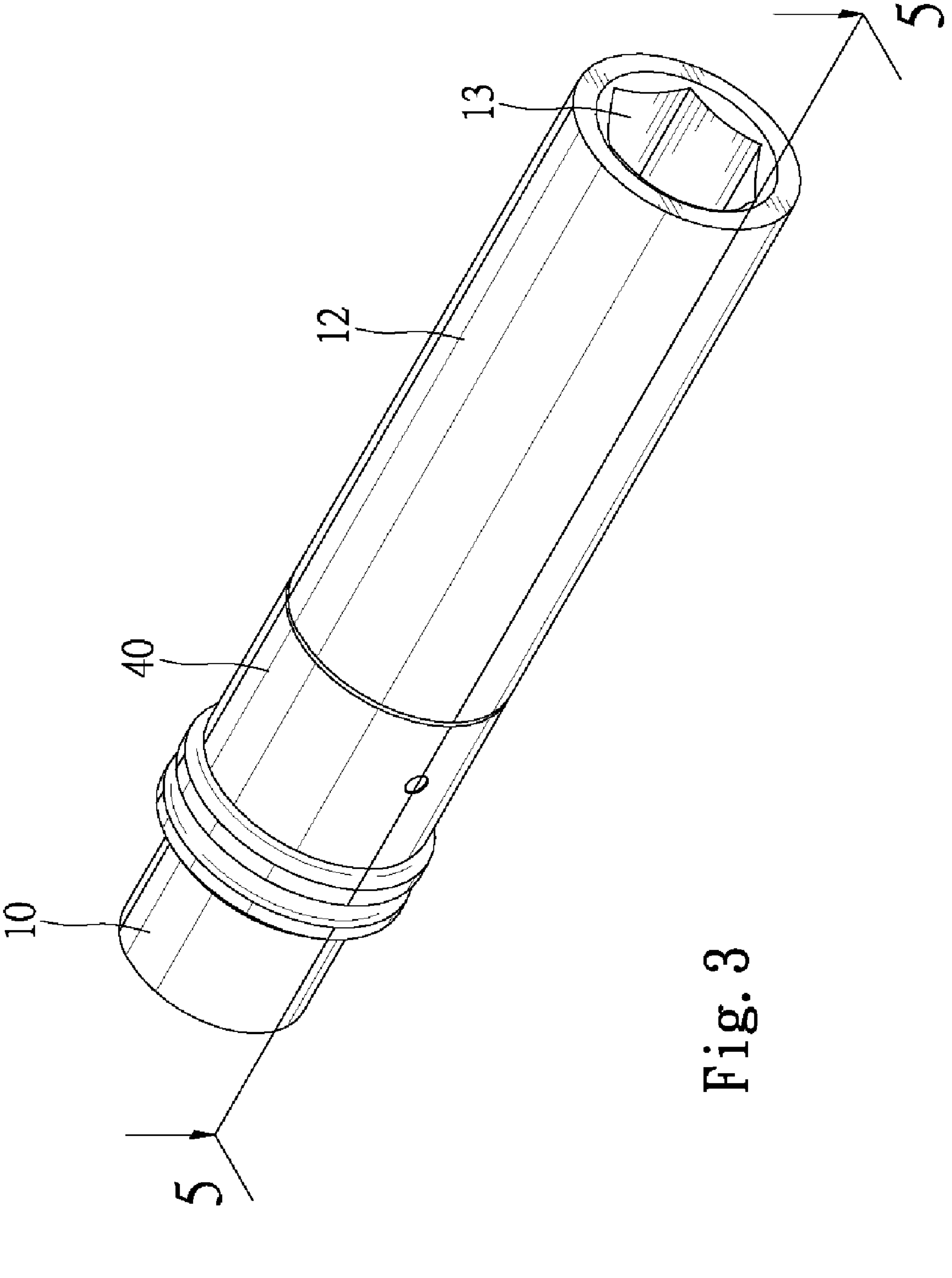
FIG. 3 is a perspective view showing a coupling device according to the preferred teachings of the present invention.
Figure 4:
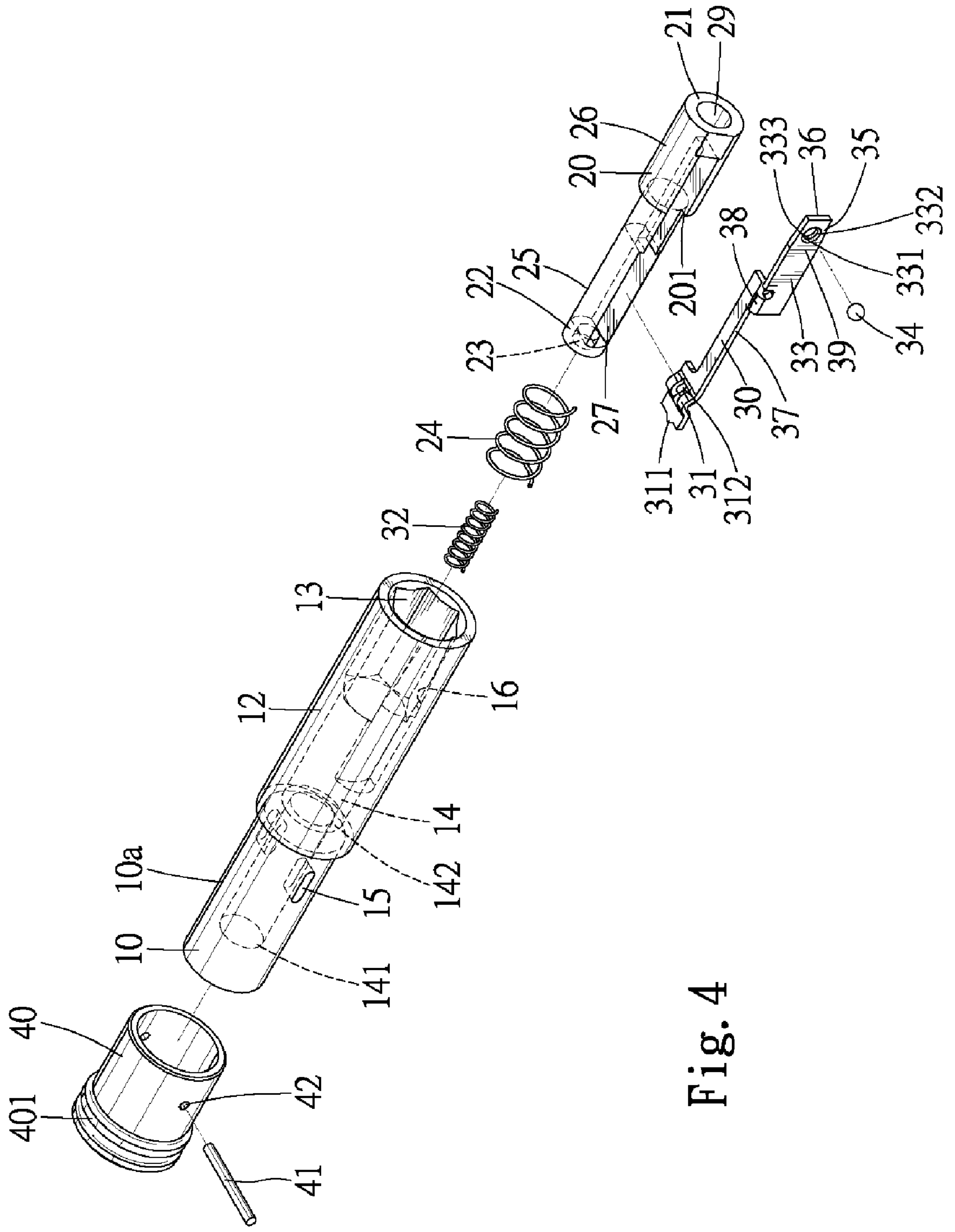
FIG. 4 is an exploded perspective view of the coupling device according to the preferred teachings of the present invention.
Figure 5:
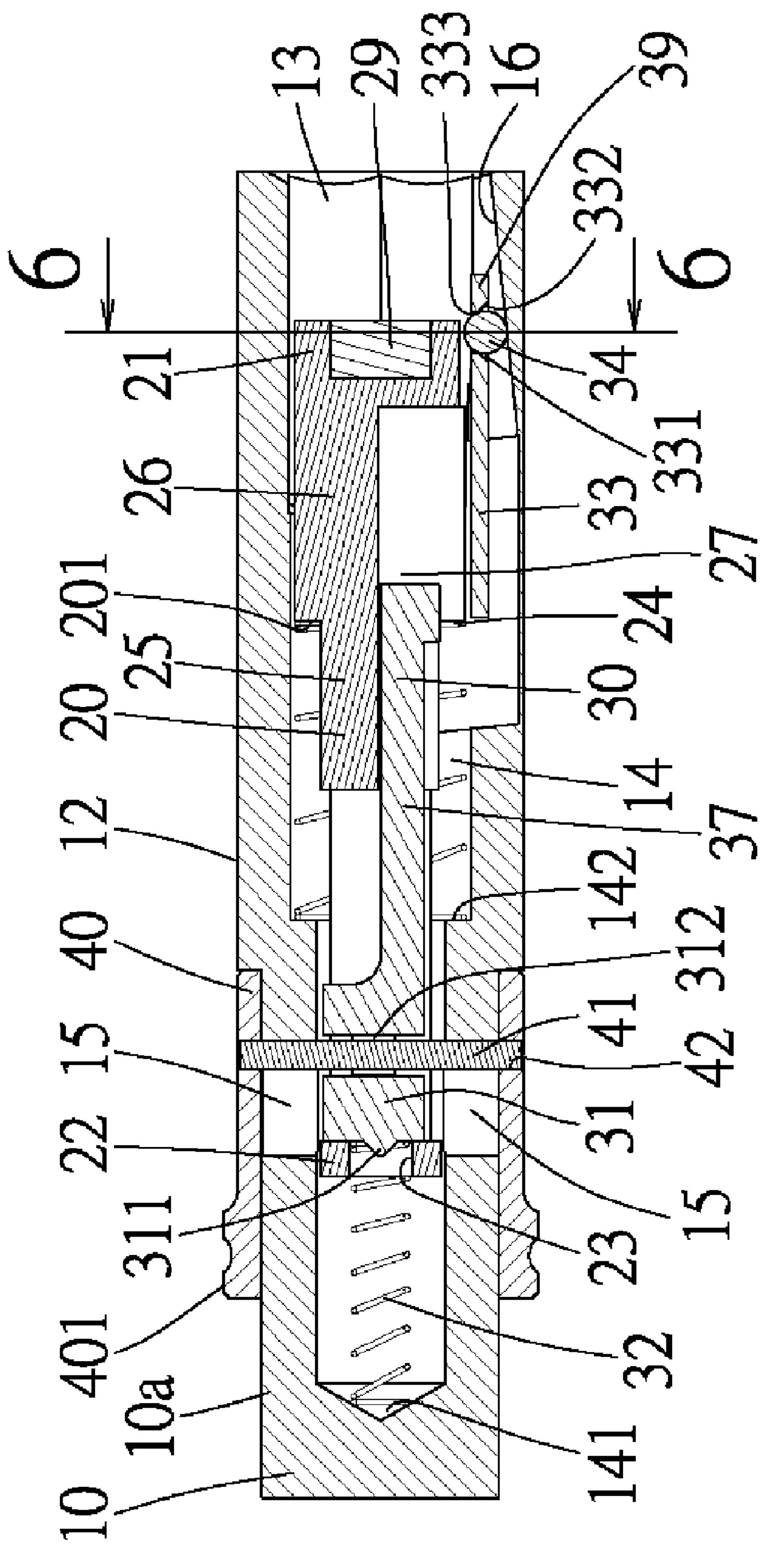
FIG. 5 is a sectional view taken along plane 5-5 in FIG. 3.
Figure 6:
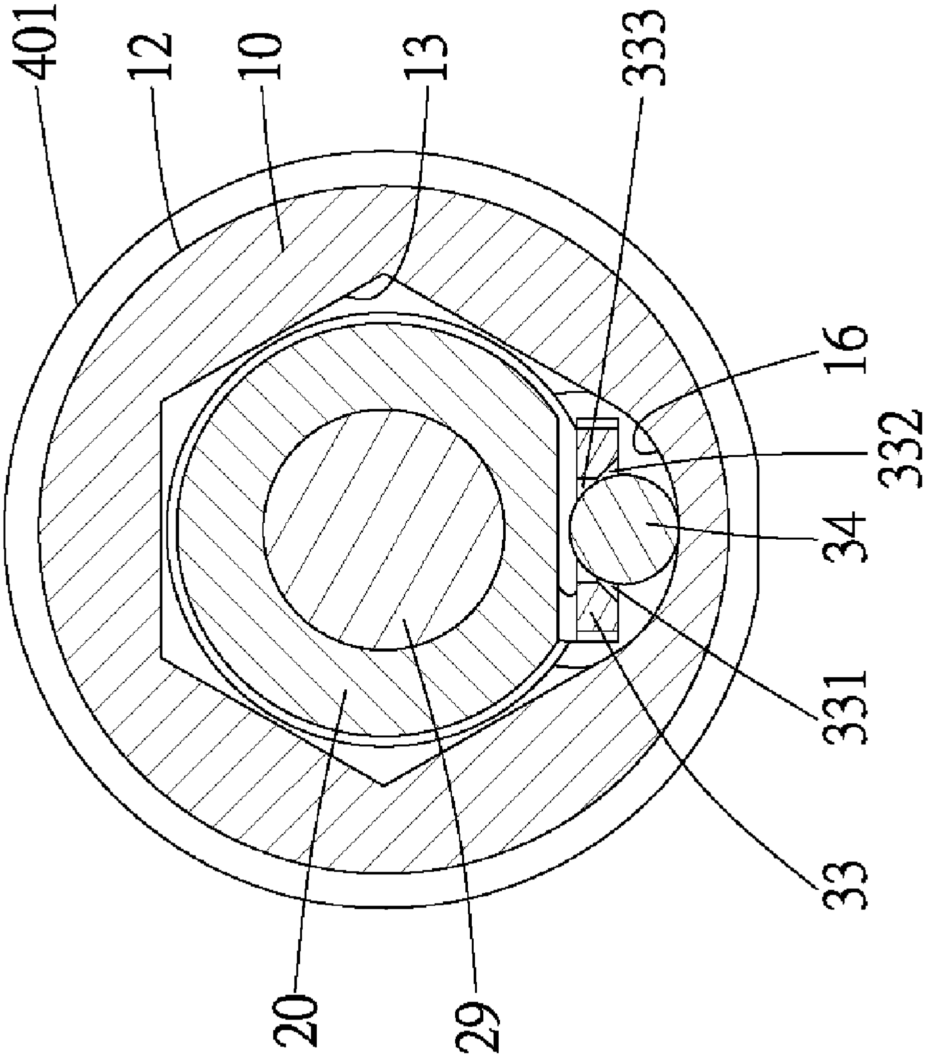
FIG. 6 is a sectional view taken along plane 6-6 in FIG. 5.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “end”, “portion”, “section”, “inner”, “outer”, “transition”, “longitudinal”, “axial”, “radial”, “peripheral”, “lateral”, “rectilinear”, “outward”, “inward”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A coupling device according to the preferred teachings of the present invention is shown in FIGS. 3 through 13 of the drawings. The coupling device according to the preferred teachings of the present invention can be used to detachably couple with an object including but not limited to a bit. The coupling device according to the preferred teachings of the present invention can be attached to a handle and used as a hand tool including but not limited to a screwdriver.

According to the preferred teachings of the present invention, a coupling device includes a body 10 having a coupling section 12 and a reduced section 10*a* that has an end coupled to a handle 11. The body 10 includes a compartment 14 defined therein and having a receiving space 13 defined in the other end of the body 10 (i.e., an outer end portion of the coupling section 12). In the preferred form shown, the receiving space 13 is hexagonal for receiving a bit 90 or the like. The compartment 14 extends in a longitudinal direction of the body 10 and includes a shoulder 142. The receiving space 13 includes an inner periphery having a slanted face 16 that extends longitudinally outward and radially inward from an inner end of the receiving space 13 (namely, the receiving space 13 extends longitudinally outward with a decreased inner diameter due to provision of the slanted face 16). The body 10 further includes a guide slot 15 in a peripheral wall of the reduced section 10*a* thereof and extending in a longitudinal direction parallel to a longitudinal axis of the body 10 and in a radial direction to be in communication with the receiving compartment 14. In the preferred form shown, the guide slot 15 extends through diametrically opposed sides of the peripheral wall of the reduced section 10*a* of the body 10.

According to the preferred teachings of the present invention, a follower 30 is received in the compartment 14 and slidable in the longitudinal direction of the body 10. The follower 30 includes an inner end 31 and an outer end 39. In the most preferred form shown, the follower 30 includes an inner section 37, an outer section 33 extending perpendicularly to the inner section 37, and a transition section 38 between the inner and outer sections 37 and 33. An elastic element 32 is mounted between the inner end 31 of the follower 30 and an end wall 141 defining the compartment 14. In the most preferred form shown, the inner end 31 of the follower 30 has a protrusion 311, and the elastic element 32 is a coil spring having an end mounted around the protrusion 311 of the inner end 31 of the follower 30. Furthermore, the inner end 31 of the inner section 37 of the follower 30 includes a transverse hole 312 extending in a direction transverse to a longitudinal direction of the follower 30. The outer end 39 of the outer section 33 of the follower 30 includes a radially outer side 35 and a radially inner side 36 distant to the slanted face 16. The outer end 39 of the outer section 33 of the follower 30 includes a restraining hole 331 extending from the radially outer side 35 through the radially inner side 36. A positioning member 34 extends from the radially outer side 35 of the outer end 39 through the restraining hole 331 to the radially inner side 36 of the outer end 39 of the follower 30. The maximum outer diameter of the positioning member 34 is larger than the minimum diameter of the restraining hole 331. In the most preferred form shown, the restraining hole 331 includes a conic section 332 and a rectilinear section 333. The conic section 332 is adjacent to the radially outer side 35 and tapers from the radially outer side 35 toward the radially inner side 36, and the rectilinear section 333 is adjacent to the radially inner side 36 and has a diameter substantially the same as the minimum inner diameter of the conic section 332. In the most preferred form shown, the positioning member 34 is in the form of a ball extending from the radially outer side 35 through the restraining hole 331 to the radially inner side 36 and having a diameter slightly smaller than the maximum inner diameter of the conic section 332 and larger than the minimum inner diameter of the conic section 332.

According to the preferred teachings of the present invention, a support rod 20 is mounted in the compartment 14 of the body 10 and slidable in the longitudinal direction of the body 10. The support rod 20 includes an inner end 22 and an outer end 21. In the most preferred form shown, the support rod 20 includes an inner portion 25 and an enlarged, outer portion 26. The inner portion 25 includes a groove 27 extending in the longitudinal direction of the body 10 and through opposite lateral sidewalls of the inner portion 25 into the outer portion 26. The inner section 37 of the follower 30 is slidably received in the groove 27. An inner end wall defining an inner end of the groove 27 forms the inner end 22 of the inner portion 25 and includes a through-hole 23 in communication with the groove 27. The inner section 37 of the follower 30 is slidably received in the groove 27 of the support rod 20, with the outer section 33 of the follower 30 located outside the groove 27 and parallel to and spaced from the outer portion 26 of the support rod 20. The inner end 31 of the follower 30 abuts against the inner end 22 of the support rod 20, with the protrusion 311 extending into the through-hole 23 of the inner end 22 of the support rod 20. The elastic element 32 mounted between the end wall 141 of the receiving compartment 14 and the inner end 31 of the follower 30 extends through the through-hole 23 of the inner end 22 of the support rod 20. A magnet 29 is mounted in the outer end 21 of the support rod 20. An elastic element 24 is mounted around the inner portion 25 of the support rod 20 and mounted between a shoulder 201 on the inner end of the outer portion 26 of the support rod 20 and the shoulder 142 of the body 10.

In the most preferred form shown, a release member 40 in the form of a sleeve is mounted around the reduced section 10*a* of the body 10 and includes a pin hole 42 extending through diametrically opposed sides of a periphery of the release member 40. A pin 41 is extended through the pin hole 42 of the release member 40, the guide slot 15 of the body 10, the transverse hole 312 of the inner end 31 of the follower 30, and the groove 27 of the inner portion 25 of the support rod 20. Thus, movement of the release member 40 in the longitudinal direction of the body 10 away from the receiving space 13 compresses the elastic elements 32 and 24 and causes longitudinal movement of the follower 30 and the support rod 20 away from the receiving space 13. The outer diameter of the release member 40 is not greater than that of the coupling section 12 of the body 10 such that the release member 40 mounted to the body 10 will not hinder operation of the body 10 in a limited space. The release member 40 may include an anti-slip portion 401 on an end thereof to allow easy grip by a user.

Now that the basic construction of the coupling device of the preferred teachings of the present invention has been explained, the operation and some of the advantages of the coupling device can be set forth and appreciated.

Figure 7:
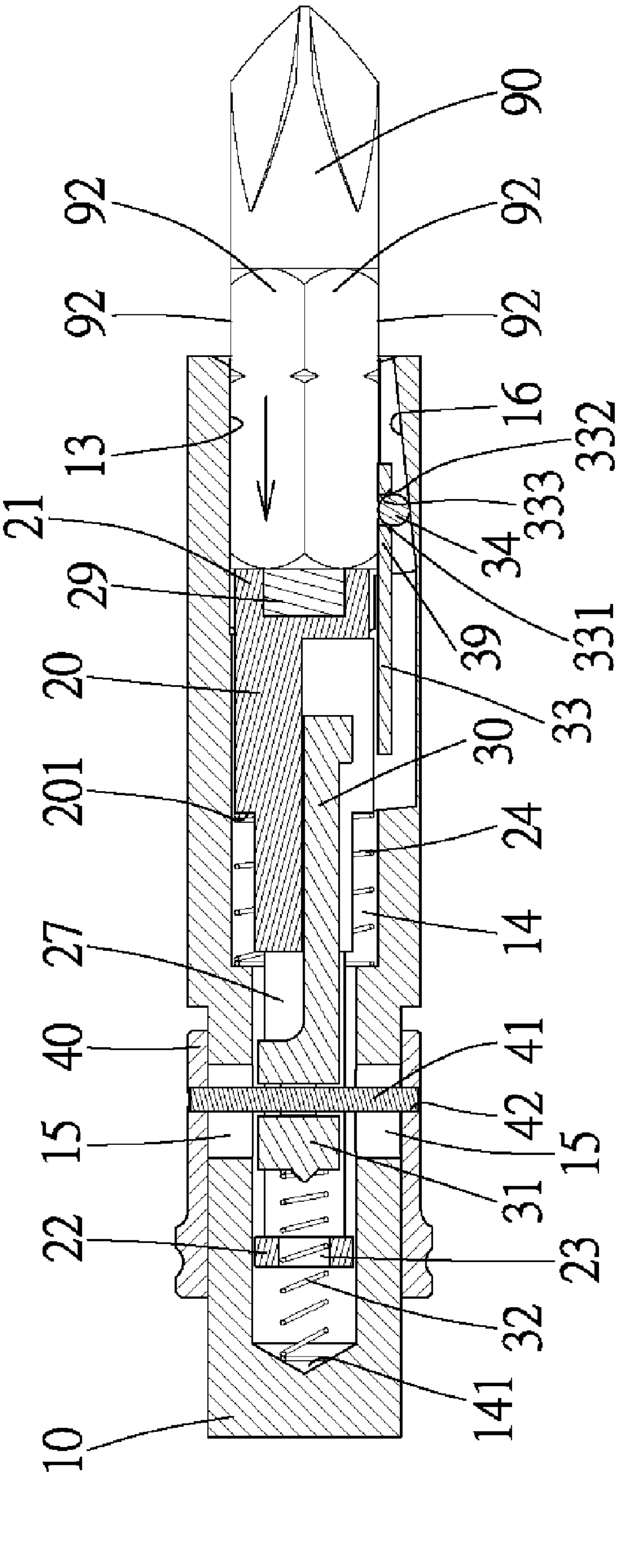
FIG. 7 is a sectional view similar to FIG. 5, illustrating coupling of a bit to the bit coupling device according to the preferred teachings of the present invention.

With reference to FIG. 7, when a bit 90 is inserted into the receiving space 13, the support rod 20 is pushed inward and the elastic element 24 is compressed. A face 92 of the bit 90 comes in contact with the positioning member 34 and presses the positioning member 34 radially outward. It is noted that the positioning member 34 slides longitudinally inward along the slanted face 16 such that the follower 30 also moves longitudinally inward in the compartment 14 and the elastic element 32 is compressed. Namely, the release member 40 and its pin 41 move longitudinally away from the receiving space 13. It is noted that the inner end 22 of the support rod 20 moves away from inner end 31 of the follower 30.

Figure 8:
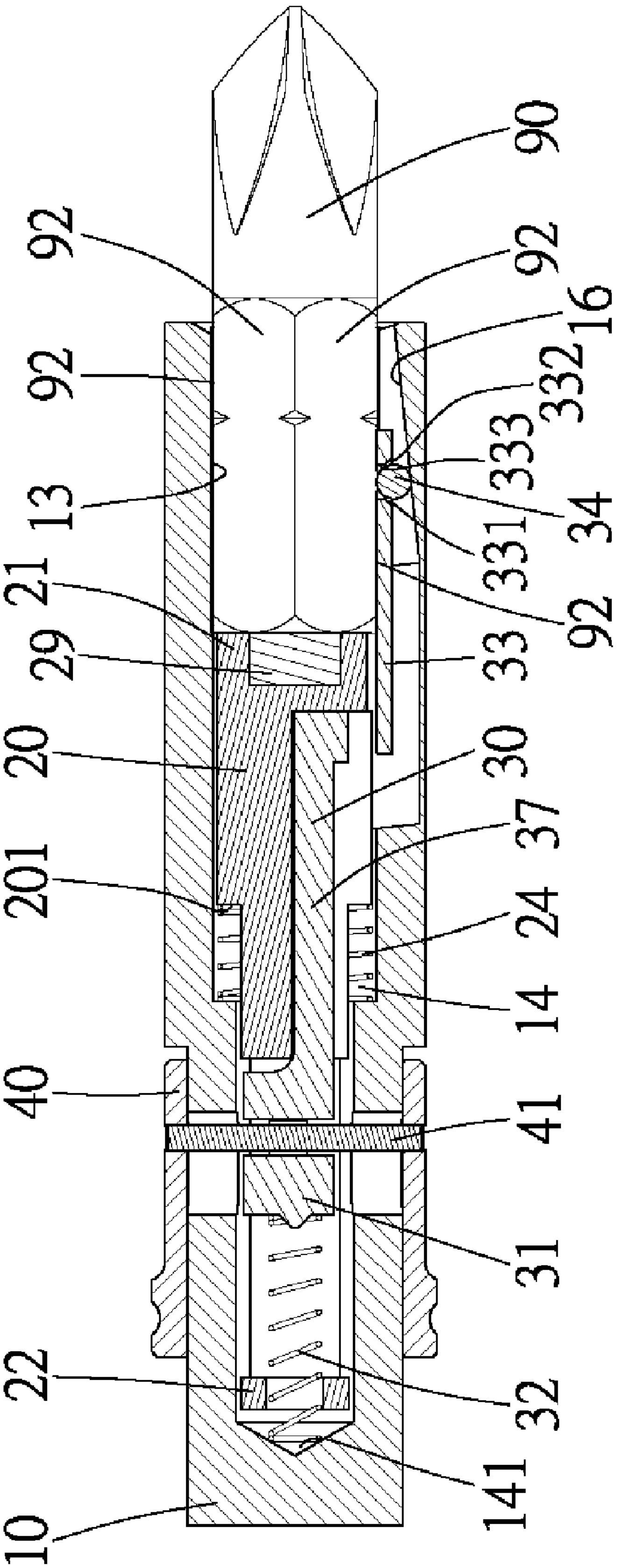
FIG. 8 is a sectional view similar to FIG. 7, wherein the bit is in a coupled position.

With reference to FIG. 8, when the bit 90 is moved further longitudinally inward to a coupled position, follower 30 is moved longitudinally toward the receiving space 13 under the action of the elastic element 32 such that the outer section 33 of the follower 30 urge the positioning member 34 to move longitudinally outward along the slanted face 16. Due to provision of the slanted face 16, a radially inward clamping force is applied through the positioning member 34 to the face 92 of the bit 90. Thus, the bit 90 is securely clamped in the receiving space 13 between the follower 30 and a portion of the inner periphery of the receiving space 13 opposite to the follower 30. A reliable positioning effect is provided for the bit 90. It is noted that the inner end 22 of the support rod 20 moves farther away from inner end 31 of the follower 30, as the support rod 20 is pushed longitudinally inward when the bit 90 is moved further longitudinally inward.

Figure 9:
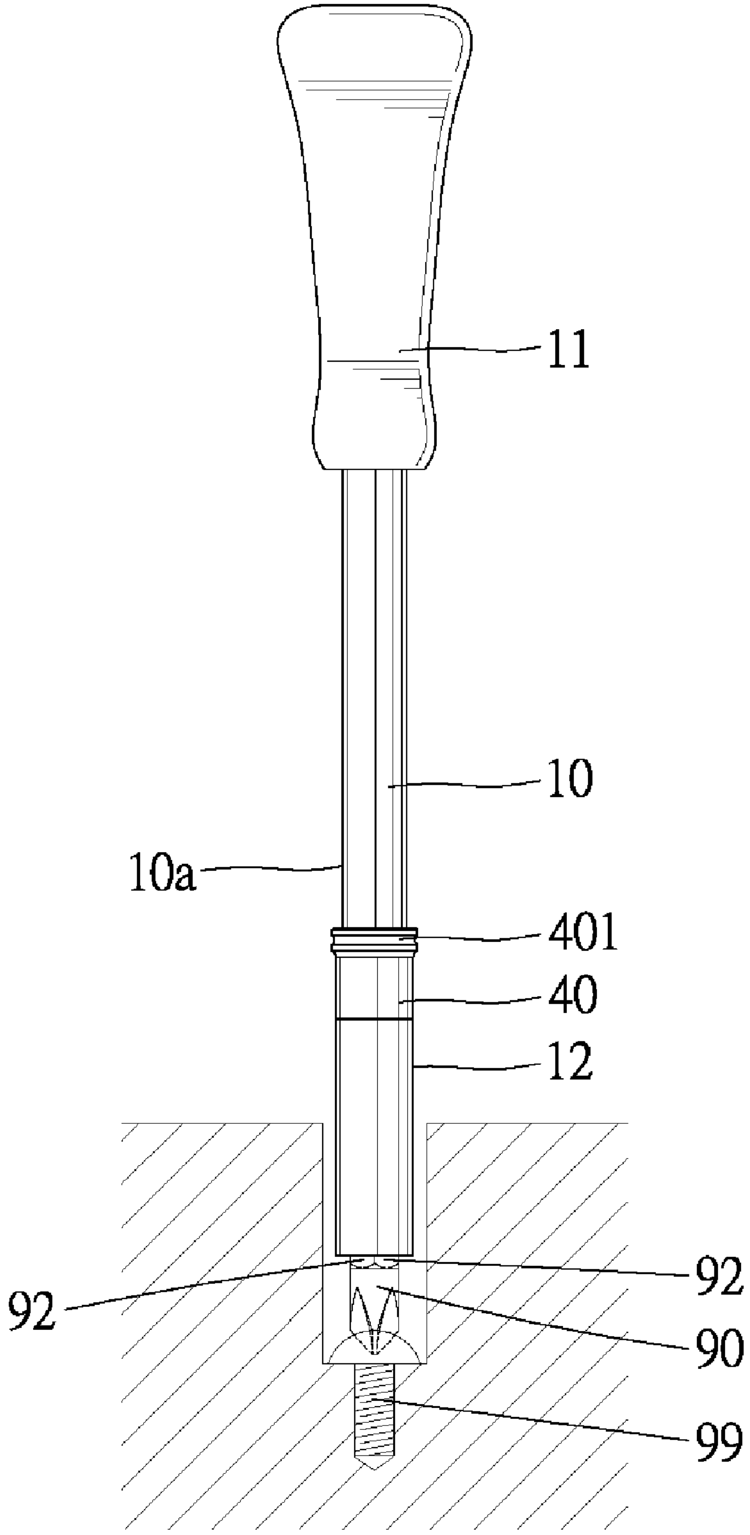
FIG. 9 is a schematic view illustrating use of a screwdriver with the coupling device according to the preferred teachings of the present invention.

With reference to FIG. 9, since the release member 40 is mounted around the reduced section 10*a* of the body 10 rather than the outer, coupling section 12 of the body 10 and since the outer diameter of the release member 40 is not greater than the maximum diameter of the body 10, the release member 40 will not hinder operation of the tool using the coupling device according to the preferred teachings of the present invention for driving a screw 99 in a limited space.

Figure 10:
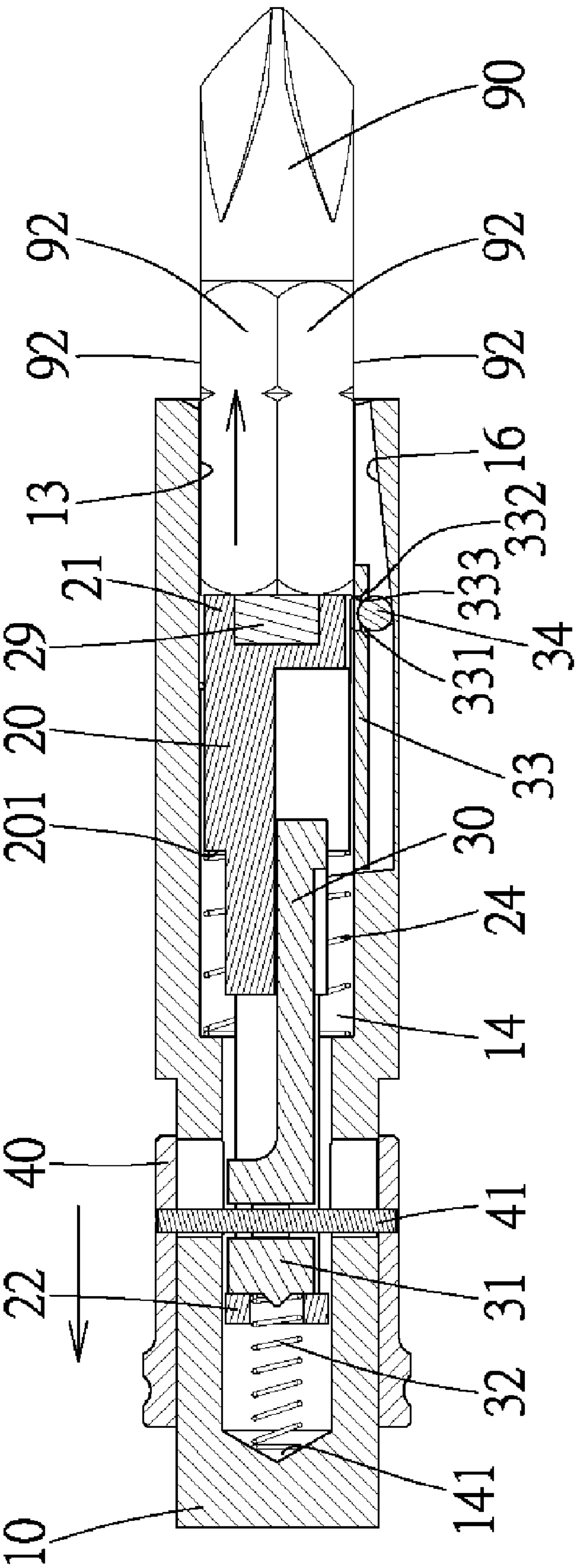
FIG. 10 is a sectional view illustrating detachment of the bit from the coupling device according to the preferred teachings of the present invention.

With reference to FIG. 10, when detachment of the bit 90 is required, the release member 40 is moved longitudinally away from the receiving space 13 to move the follower 30 longitudinally inward while compressing the elastic element 32. The pin 41 moves longitudinally along the groove 27 of the inner portion 25 of the support rod 20 and along the guide slot 15 of the reduced section 10*a* of the body 10. The positioning member 34 is also moved longitudinally inward along the slanted face 16 and hence away from the face 92 of the bit 90 such that no clamping force is imparted to the bit 90. Meanwhile, the support rod 20 pushes the bit 90 away from the receiving space 13 under the action of the elastic element 24 until the inner end 22 of the support rod 20 comes in contact with and is stopped by inner end 31 of the follower 30.

Figure 11:
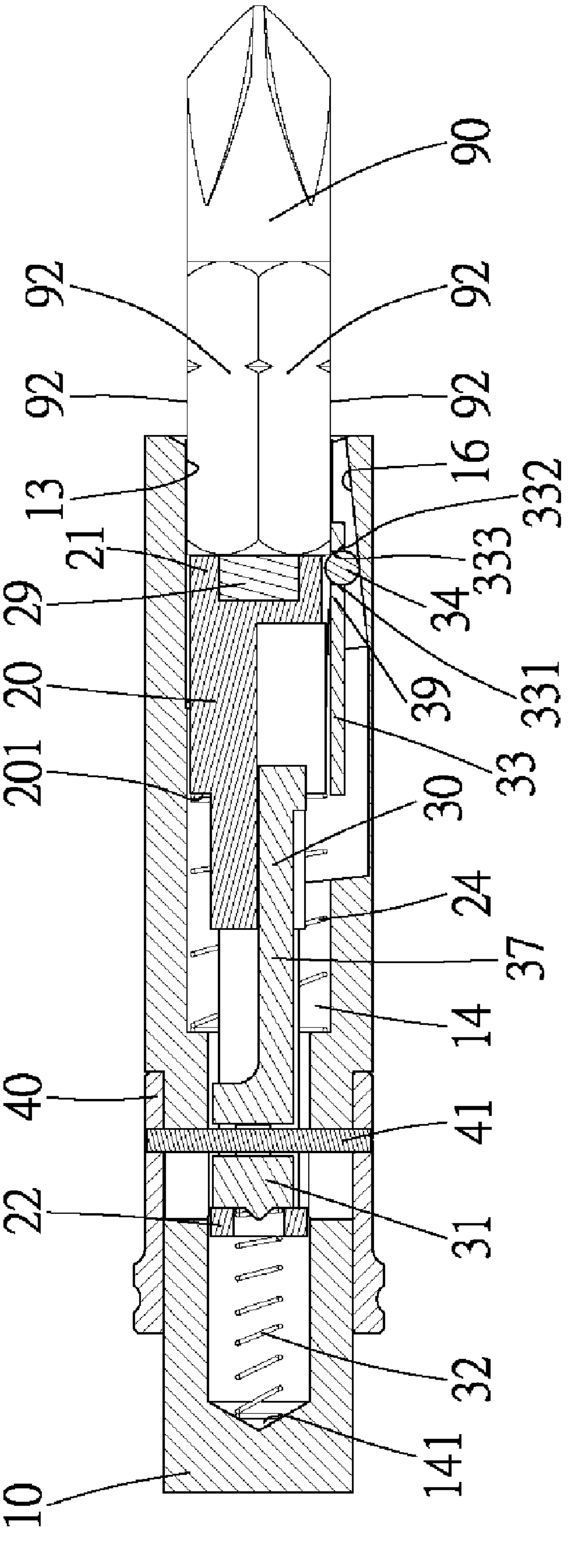
FIG. 11 is a sectional view similar to FIG. 10, wherein the bit is pushed outward to a position allowing easy removal of the bit from the coupling device according to the preferred teachings of the present invention.
Figure 12:
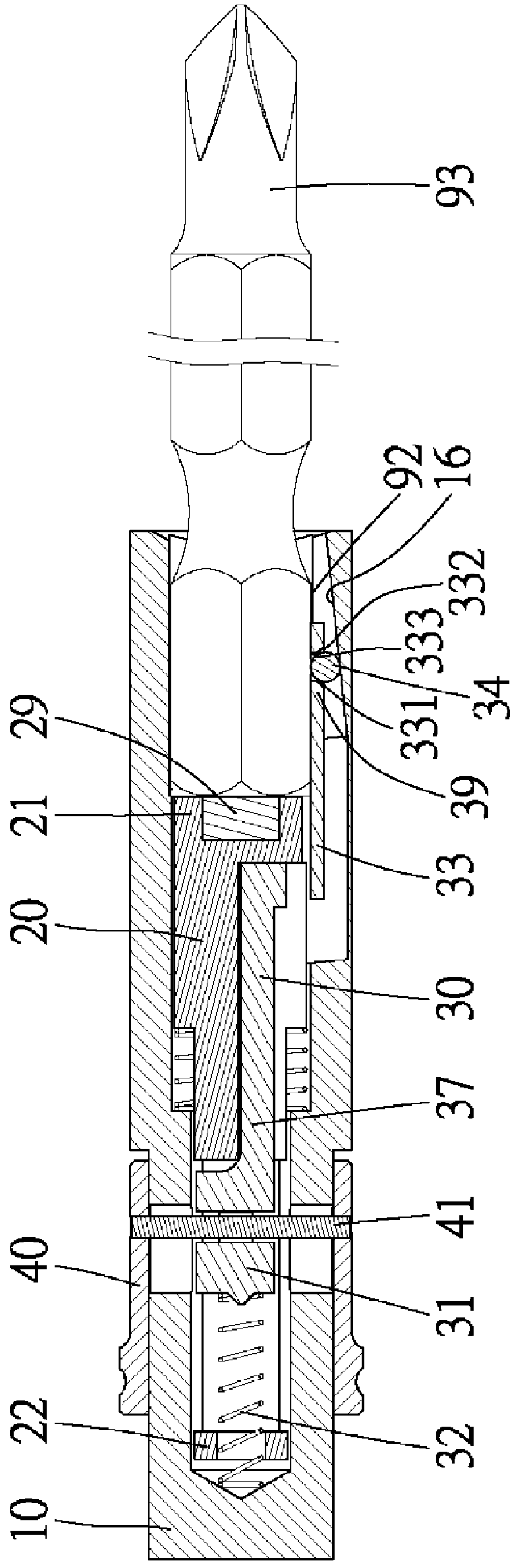
FIG. 12 is a sectional view illustrating use of the coupling device according to the preferred teachings of the present invention with a bit of another type.
Figure 13:
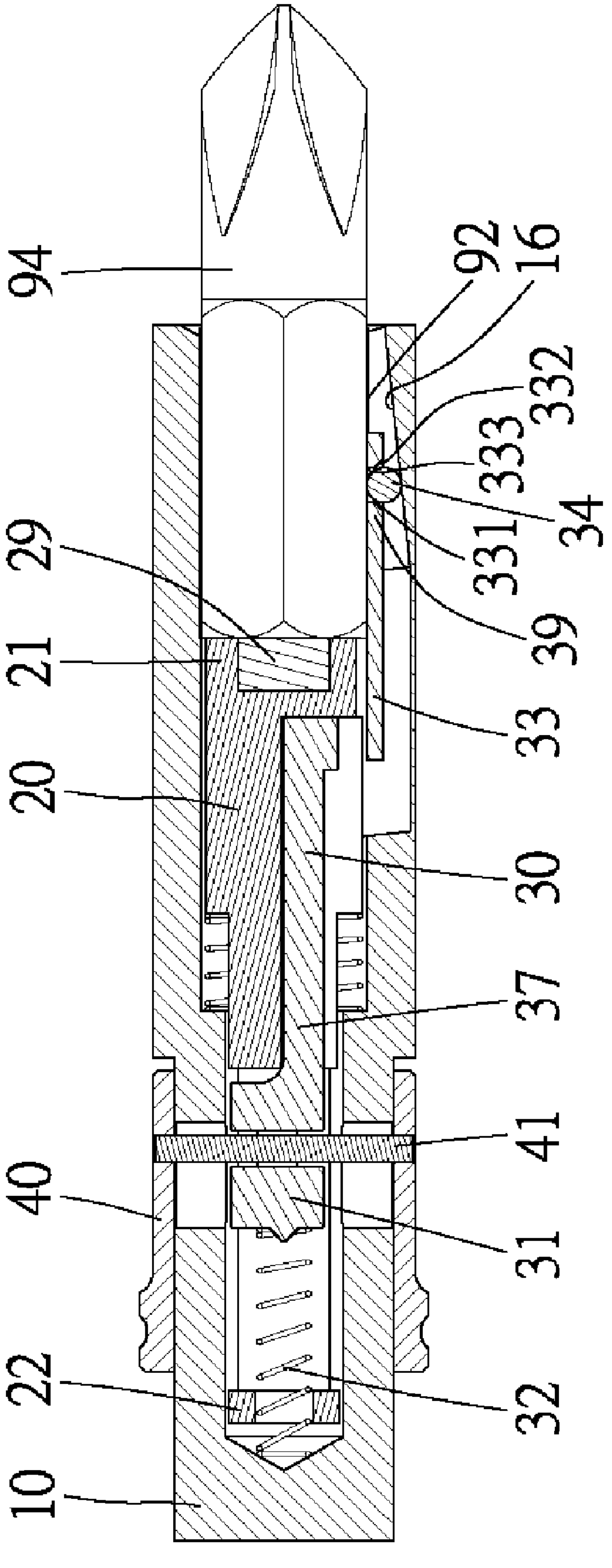
FIG. 13 is a sectional view illustrating use of the coupling device according to the preferred teachings of the present invention with a bit of a further type.

With reference to FIG. 11, the release member 40 is then released, and the elastic element 32 pushes the follower 30 outward toward the receiving space 13. The support rod 20 is moved to its outermost position in which the exposed portion of bit 90 outside the body 10 is large enough to allow easy removal of the bit 90 from the receiving space 13 even though there is oil on the user's hand. Due to provision of the magnet 29 in the outer end 21 of the support rod 20, the bit 90 will still be attracted to the magnet 29 when the support rod 20 moves longitudinally outward under the action of the elastic element 24.

It can be appreciated that the support rod 20 and the release member 40 can be omitted. Nevertheless, the support rod 20 provides reliable support for the bit 90, and the magnet 29 in the outer end 21 of the support rod 20 may securely retain the bit 90 in the body 10 while the release member 40 allows easy removal of the bit 90. It can be further appreciated that the coupling device according to the preferred teachings of the present invention can be used with bits 93 and 94 of other types including but not limited to those shown in FIGS. 12 and 13. The coupling is stepless in a way; namely, the bit 90 can be positioned in any suitable position of the positioning member 34 on the slanted face 16 with appropriate clamping force.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A coupling device comprising, in combination:

a body including a first end adapted to be coupled with a handle and a second end adapted for removably receiving an object, with the body including a compartment having a receiving space adapted for receiving the object, with the receiving space including an inner periphery having a slanted face that extends longitudinally outward and radially inward from an inner end of the receiving space, with the body further including a guide slot in a peripheral wall thereof, with the guide slot extending in a longitudinal direction parallel to a longitudinal axis of the body and in a radial direction to be in communication with the compartment;

a follower mounted in the compartment and slidable in the longitudinal direction, with the follower including an inner end and an outer end, with the outer end of the follower including a radially outer side and a radially inner side distant to the slanted face, with the outer end of the follower further including a restraining hole extending from the radially outer side through the radially inner side, with the inner end of the follower including a transverse hole extending in a direction transverse to the longitudinal direction;

a positioning member extending from the radially outer side through the restraining hole to the radially inner side, with the positioning member being slidable along the slanted face and having a maximum outer diameter larger than a minimum diameter of the restraining hole;

a first elastic element mounted in the compartment and abutting against the follower;

a release member mounted to the body; and a pin extending through the release member, the guide slot of the body, and the transverse hole of the follower such that movement of the release member in the longitudinal direction away from the receiving space causes longitudinal movement of the follower and the positioning member away from the receiving space to release the radial clamping force, allowing removal of the object from the receiving space;

wherein the follower is biased outward by the first elastic element toward the receiving space when the object is inserted into the receiving space and moves the follower longitudinally inward, with the positioning member securely clamping the object in the receiving space between the follower, with a radial clamping force being imparted from the slanted face through the positioning member to the object.

2. The coupling device as claimed in claim 1, with the first elastic element being mounted between the inner end of the follower and an end wall of the compartment opposite to the receiving space.

3. The coupling device as claimed in claim 2, with the inner end of the follower including a protrusion, with the first elastic element being a coil spring having an end mounted around the protrusion.

4. The coupling devise as claimed in claim 1, with the body including a reduced section into which the compartment extends, with the guide slot extending through diametrically opposed sides of the reduced section of the body, with the release member being a sleeve mounted around the reduced section and including a pin hole, and with the pin extending through the pin hole, the guide slot of the body, and transverse hole of the follower.

5. The coupling devise as claimed in claim 4, with the release member having an outer diameter not greater than a maximum outer diameter of the body.

6. The coupling device as claimed in claim 4, with the restraining hole including a conic section and a rectilinear section, with the conic section being adjacent to the radially outer side and tapering from the radially outer side toward the radially inner side, with the rectilinear section being adjacent to the radially inner side and having a diameter substantially the same as a minimum inner diameter of the conic section, and with the positioning member being a ball having a diameter slightly smaller than a maximum inner diameter of the conic section and larger than the minimum inner diameter of the conic section.

7. The coupling device as claimed in claim 1, with the restraining hole having reduced inner diameter toward the radially inner side.

8. The coupling device as claimed in claim 1, with the restraining hole including a conic section and a rectilinear section, with the conic section being adjacent to the radially outer side and tapering from the radially outer side toward the radially inner side, with the rectilinear section being adjacent to the radially inner side and having a diameter substantially the same as a minimum inner diameter of the conic section, and with the positioning member being a ball having a diameter slightly smaller than a maximum inner diameter of the conic section and larger than the minimum inner diameter of the conic section.

9. A coupling device comprising, in combination:

a body including a first end adapted to be coupled with a handle and a second end adapted for removably receiving an object, with the body including a compartment having a receiving space adapted for receiving the object, with the receiving space including an inner periphery having a slanted face that extends longitudinally outward and radially inward from an inner end of the receiving space;

a support rod mounted in the compartment and slidable in a longitudinal direction of the body, with the support rod including an outer end having a magnet mounted therein for attracting the object;

a follower mounted in the compartment and slidable in the longitudinal direction of the body, with the follower including an inner end and an outer end, with the outer end of the follower including a radially outer side and a radially inner side distant to the slanted face, with the outer end of the follower further including a restraining hole extending from the radially outer side through the radially inner side;

a positioning member extending from the radially outer side through the restraining hole to the radially inner side, with the positioning member being slidable along the slanted face and having a maximum outer diameter larger than a minimum diameter of the restraining hole; and a first elastic element mounted in the compartment and abutting against the follower;

wherein the follower is biased outward by the first elastic element toward the receiving space when the object is inserted into the receiving space and moves the follower longitudinally inward, with the positioning member securely clamping the object in the receiving space between the follower and a portion of the inner periphery of the receiving space opposite to the follower, with a radial clamping force being imparted from the slanted face through the positioning member to the object.

10. The coupling device as claimed in claim 9, with the support rod including an inner portion having an inner end and an outer portion having the outer end, with the support rod further including a groove extending in the longitudinal direction of the body and through opposite sidewalls of the inner portion, with an end wall defining an inner end of the groove forming the inner end of the inner portion, with the follower including an inner section, an outer section, and a transition section between the inner and outer sections, with the inner section of the follower being slidably received in the groove of the support rod, and with the outer section of the follower being outside the groove and parallel to and spaced from the outer portion of the support rod.

11. The coupling device as claimed in claim 10, with the inner end of the support rod including a through-hole in communication with the groove of the inner portion of the support rod, and with the first elastic element extending through the through-hole of the inner end of the support rod.

12. The coupling device as claimed in claim 11, with the inner end of the follower including a protrusion, with the first elastic element being a coil spring having an end mounted around the protrusion.

13. The coupling device as claimed in claim 11, with the compartment of the body further including a first shoulder, with the outer portion of the support rod including a second shoulder, with the coupling device further including a second elastic element mounted between the first and second shoulders, with the second elastic element being compressed when the object is received in the receiving space, with the second elastic element pushing the object outward away from the receiving space when a release member is moved longitudinally away from the receiving space and, thus, releases the radial clamping force, and with the first elastic element pushing the object outward away from the receiving space such that an exposed portion of the object outside the receiving space allows easy removal of the object from the receiving space when the release member is released.

14. The coupling device as claimed in claim 10, with the compartment of the body further including a first shoulder, with the outer portion of the support rod including a second shoulder, with the coupling device further including a second elastic element mounted between the first and second shoulders, with the second elastic element being compressed when the object is received in the receiving space, with the second elastic element pushing the object outward away from the receiving space when a release member is moved longitudinally away from the receiving space and, thus, releases the radial clamping force, and with the first elastic element pushing the object outward away from the receiving space such that an exposed portion of the object outside the receiving space allows easy removal of the object from the receiving space when the release member is released.

15. The coupling device as claimed in claim 10, with the body including a guide slot in a peripheral wall thereof, with the guide slot extending in the longitudinal direction parallel to a longitudinal axis of the body and in a radial direction to be in communication with the compartment, with the inner end of the follower including a transverse hole extending in a direction transverse to the longitudinal direction, with the coupling device further including a release member mounted to the body, with a pin extending through the release member, the guide slot of the body, the transverse hole of the follower, and the groove of the support rod such that movement of the release member in the longitudinal direction away from the receiving space causes longitudinal movement of the follower and the positioning member away from the receiving space to release the radial clamping force, allowing removal of the object from the receiving space.

16. The coupling device as claimed in claim 15, with the body including a reduced section into which the compartment extends, with the guide slot extending through diametrically opposed sides of the reduced section of the body, with the release member being a sleeve mounted around the reduced section and including a pin hole, and with the pin extending through the pin hole, the guide slot of the body, the transverse hole of the follower, and the groove of the support rod.

17. The coupling device as claimed in claim 16, with the release member having an outer diameter not greater than a maximum outer diameter of the body.

18. The coupling device as claimed in claim 10, with the restraining hole including a conic section and a rectilinear section, with the conic section being adjacent to the radially outer side and tapering from the radially outer side toward the radially inner side, with the rectilinear section being adjacent to the radially inner side and having a diameter substantially the same as a minimum inner diameter of the conic section, and with the positioning member being a ball having a diameter slightly smaller than a maximum inner diameter of the conic section and larger than the minimum inner diameter of the conic section.

19. The coupling device as claimed in claim 9, with the restraining hole including a conic section and a rectilinear section, with the conic section being adjacent to the radially outer side and tapering from the radially outer side toward the radially inner side, with the rectilinear section being adjacent to the radially inner side and having a diameter substantially the same as a minimum inner diameter of the conic section, and with the positioning member being a ball having a diameter slightly smaller than a maximum inner diameter of the conic section and larger than the minimum inner diameter of the conic section.

* * * * *